Patented June 24, 1930

1,768,447

UNITED STATES PATENT OFFICE

HENRY J. HAIN, OF VERMILION, OHIO, ASSIGNOR TO THE SHERWIN-WILLIAMS COMPANY, OF CLEVELAND, OHIO, A CORPORATION OF OHIO

COATING COMPOSITION

No Drawing.   Application filed June 9, 1927.   Serial No. 197,767.

This invention relates to a composition to be applied as a coating to wood, metal and other surfaces, and the object is to provide coating material which may be used either in a fluid state or in a more viscous condition as a heavy coating or plaster, and which will exhibit the desired characteristics of such a coating as will be later pointed out.

The coating composition of my invention comprises a mixture of calcium carbonate, in the form which is commercially known as whiting, or other mineral pigment together with linseed meal. If desired, other mineral substances may be substituted for whiting, and coloring material may be incorporated to provide desired colors and tints.

The linseed meal is the usual commercial linseed meal which is prepared from linseed cake from which the oil has been largely extracted. Under the term linseed meal I intend to include linseed flour or intermediate conditions between flour and meal.

The best proportions which I have found for combining the mineral pigment and the linseed meal is twenty (20) parts by weight of the linseed meal mixed with one hundred (100) parts by weight of the mineral pigment, such for instance as whiting. To this mixture, at the time of its use, there may be added the desired quantity of water to produce a coating of the desired consistency. Sufficient water may be added to provide a fluid coating composition which may be applied by a brush or spraying apparatus, and on the other hand, by limiting the amount of water added, a thick or plaster like coating may be provided which may be applied to the surface to be covered by means of a trowel or other suitable tool.

As the coating, after application to a surface dries, the water evaporates and the mucilaginous or adhesive properties of the linseed meal effect a cementing action causing firm and permanent adhesion of the coating to the surface on which it has been applied.

The coating has considerable permanent elasticity, and has the further advantage of being a poor conductor of heat, so that it produces a coating of much greater heat insulating properties than coatings now ordinarily in use with which I am familiar.

The composition of the mineral pigment and the linseed meal are prepared in the dry state, and may be preserved indefinitely in this dry form in suitable packages, it being merely necessary to keep water away from the composition until the time when the composition is to be used. This makes the composition easily handled in a commercial way.

While I have set forth the preferred composition, it will be understood that variations may be made, as I have already suggested, and variations in the mineral pigment may require slight changes in the proportion of linseed meal, in order to give the desired results. However, such variations I consider within the scope of my invention.

Having thus described my invention, what I claim as new is:

1. A dry coating composition adapted to be mixed with a liquid when used, which consists of a finely comminuted mineral substance and linseed meal.

2. A coating composition adapted to be mixed with a liquid when used, in which composition the major part consists of a finely comminuted mineral substance, and the smaller part consists of linseed meal.

3. A coating composition consisting of a pigment, linseed meal and water.

4. A dry mixture consisting of approximately one hundred parts by weight of calcium carbonate and twenty parts by weight of linseed meal.

In testimony whereof, I hereunto affix my signature.

HENRY J. HAIN.